US006092426A

United States Patent [19]

Vollenweider et al.

[11] Patent Number: 6,092,426

[45] Date of Patent: Jul. 25, 2000

[54] HIGH-PRESSURE SENSOR

[75] Inventors: Kurt Vollenweider, Humlikon; Hans Conrad Sonderegger, Neftenbach, both of Switzerland

[73] Assignee: K.K. Holdings AG, Winterthur, Switzerland

[21] Appl. No.: 09/340,202

[22] Filed: Jun. 28, 1999

[30] Foreign Application Priority Data

Jul. 14, 1998 [CH] Switzerland ............................ 1500/98

[51] Int. Cl.[7] ........................................................ G01L 7/00

[52] U.S. Cl. ................................................ 73/756; 73/707

[58] Field of Search ............................. 73/707, 715, 726, 73/727, 756, 729.1, 729.2, 730, 731

[56] References Cited

U.S. PATENT DOCUMENTS 4,164,938 8/1979 Patton ...................................... 73/731
5,186,055 2/1993 Kovacich et al. ........................ 73/727
5,850,778 12/1998 Fischbach ................................ 99/342

*Primary Examiner*—Max Noori
*Assistant Examiner*—Abdullahi Aw-Musse
*Attorney, Agent, or Firm*—Barnes & Thornburg

[57] ABSTRACT

A high-pressure sensor specially for monitoring pulsating hydraulic pressure impulses, as for example in injection systems of combustion engines is provided with a pressure space shaped balloon-like before the diaphragm part, enabling optimal measuring signals to be combined simultaneously with significantly reduced mechanical forces in the welded joint. In addition, welding techniques are proposed enabling a gapless internal welding zone to be achieved, so that notch effects and migratory cracks resulting from these and leading to fractures are obviated. As optimal connection between measuring head and threaded body a two-stage welding routine is proposed first an internal weld is performed by electrical upset welding and then external welding by electron beam, inert gas or laser welding.

13 Claims, 2 Drawing Sheets

Fig.1
PRIOR ART
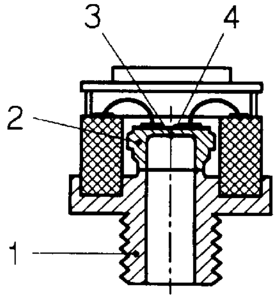
Fig.2
PRIOR ART
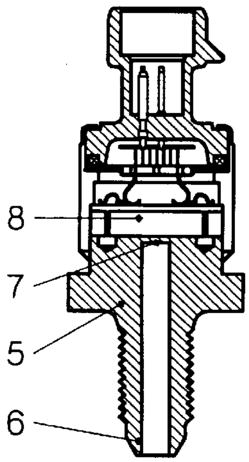
Fig.3
PRIOR APT
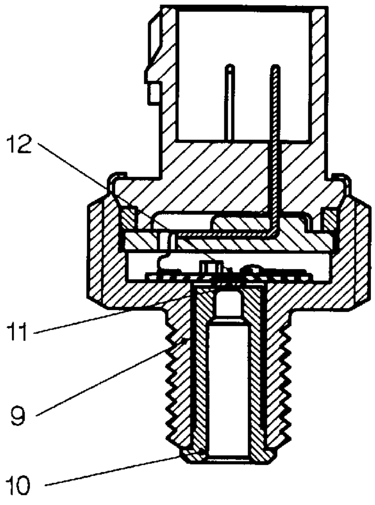
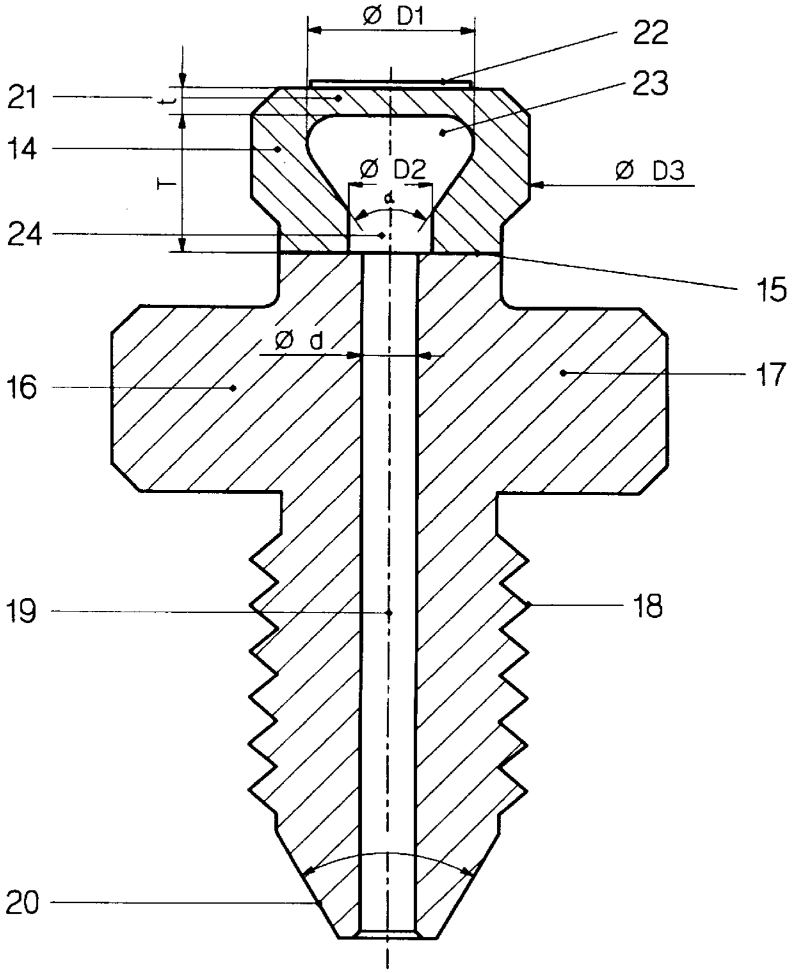
Fig.4

HIGH-PRESSURE SENSOR

BACKGROUND AND SUMMARY OF THE INVENTION

The invention concerns high-pressure sensors as used for example in injection systems of internal combustion engines or liquid-jet cutting machines, and especially where pulsating hydraulic pressures with peak values of thousands of bar are to be measured or monitored.

In particular the invention applies to diesel engine monitoring systems, where peak pressures from 2000 to 3000 bar have to be measured in continuous operation.

Due to the power increases associated almost without exception with turbocharging, ever greater fuel quantities must be combusted within ever shorter times, so that in recent years injection pressures have had to be raised continuously. Today there are high-performance engines with 3000 bar injection pressure.

In the so-called common rail systems of diesel-engined passenger cars, peak pressures up to 1500 bar are presently being used. For monitoring such engines, a number of high-pressure sensors are known. These are shown in FIGS. 1 to 3 as prior art.

The idea behind the invention is illustrated in FIGS. 4 to 7.

FIG. 1 shows a commercial piezorestistive high-pressure sensor consisting of four main parts: threaded body 1, measuring head 2, and diaphragm part 3 on which the measuring bridge 4 is mounted.

FIG. 2 shows the threaded body 5, the sealing part 6 and the diaphragm part 7, on which the capacitive measuring part 8 is located, made in one piece.

In FIG. 3 the diaphragm part 11 is integral with the sealing part 10 and welded to the threaded body 9 at the sealing part 10. The pressure pick up is measuring bridge 12 and consists of a silicone element which is overglazed on the diaphragm part 11. The prior art pressure sensors now in use are designed for maximum pressures of 1500 bar.

The invention, however, relates to high-pressure sensors for continuous operation with peak pressures exceeding 2000 bar, where far more exacting requirements are placed upon the lead to the sealing part and the diaphragm part. None of the three prior art designs has been able to meet such demands. The idea behind the invention is set out in FIGS. 4 to 7. Other objects, advantages and novel features of the present invention will become apparent from the following detailed description of the invention when considered in conjunction with the accompanying drawings.

BRIEF DESCRIPTION OF THE DRAWINGS

FIG. 1 is a cross sectional view of piezoresistant high pressure sensor according to the prior art.

FIG. 2 is a cross sectional view of a capacitive pressure sensor of the prior art.

FIG. 3 is a cross sectional view of a pressure sensor of the prior art.

FIG. 4 is across sectional schematic view of a pressure sensor according to the invention.

Figure 5:
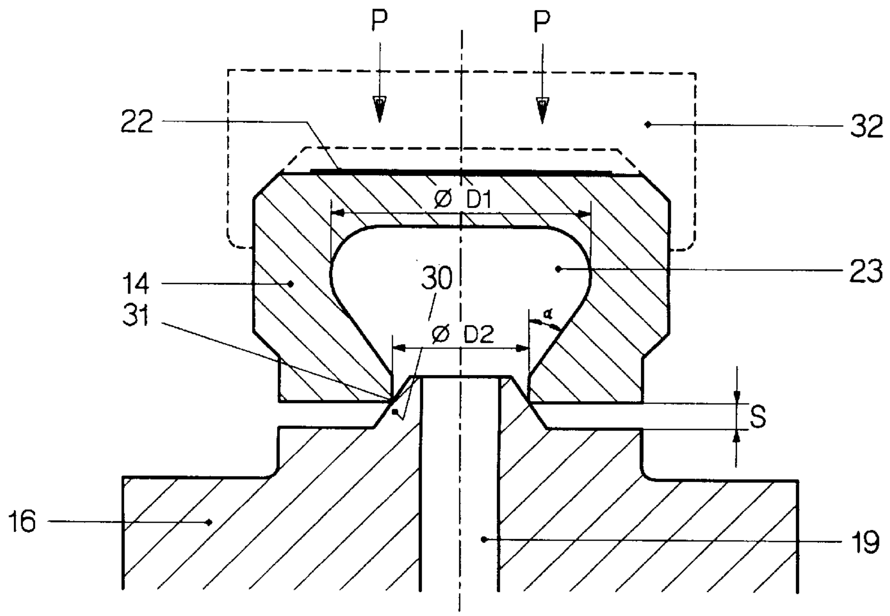
FIG. 5 shows the measuring head before internal welding.

The principal idea of the invention is based on an overall consideration of the hydraulic and mechanical parts, with the aim of arriving at a more reliable solution for continuous operation, suitable for monitoring duties.

DETAILED DESCRIPTION OF THE PREFERRED EMBODIMENTS

Pressure peaks of the order of 3500 bar must be regarded as test values for acceptance of the sensors, in order to guarantee continuous operation at 2500 bar for two service years. Such test values lie, however, at the elastic limit of still weldable high-performance stainless steels. The factors in the problem:

diaphragm part weld part lead-in part sealing part must all be related to the material limits and carefully matched.

In FIG. 4 the objectives of the invention are shown schematically. The pressure sensor consists of six main parts:

| | |
|---|---|
| threaded body | 16 |
| measuring head | 14 |
| diaphragm part | 21 |
| pressure pickup, namely measuring bridge | 22 |
| sealing part | 20 |
| weldment | 15 |

which are all mutually adapted with regard to the mechanically admissible material stresses.

Of overriding importance to the system as a whole is the design of the measuring head 14 which includes a pressure measuring space having a head portion 23 and a neck portion 24. To ensure satisfactory signals for the measuring bridge 22, the diaphragm part 21 is determined by the parameters dia. $D_1$, dia. $D_3$ and thickness t.

To keep the highly endangered weldment 15 inside the admissible material strength range, the pressure head 23 has a diameter $D_1$, greater than the pressure neck 24 with its diameter $D_2$. This ensures that:

for the optimal measuring signal, diameter $D_1$ is effective, for minimal material stressing, $D_2$ is effective, and both as the square of the difference $D_1-D_2$.

Also of great importance are minimal diameters d for the in-lead or through hole 19 and the sealing part 20, to minimize the material stresses.

Likewise important is the machinability of a balloon-like pressure space consisting of the pressure head portion 23 and the pressure neck portion 24. Its diameter, depth T and flare angle a must be matched so that they can be produced economically by modern machining techniques. Here cutting, spark erosion or a combination of both should be taken into account.

A further part of the invention concerns the geometry of the weld part 15, which is crucial to assured continuous operation of the pressure sensor. Lengthy test series have shown that weld gaps from inside, from the pressure side that is, must be avoided under all circumstances.

FIG. 5 shows the welding-on operation by internal welding at the moment of commencing the weld. For this, the threaded body 16 is provided with a welding cone 30, on which the measuring head 14 with the neck edge 31 seats. The dimensions follow the familiar regulations for electrical butt welding, whereby the measuring head 14 is held by the electrode 32 and connected electrically.

During the welding operation, fusion begins along the welding cone surface 30, whereby the pressure neck portion 24 and welding cone 30 intermingle, diminishing the welding gap S.

Figure 6:
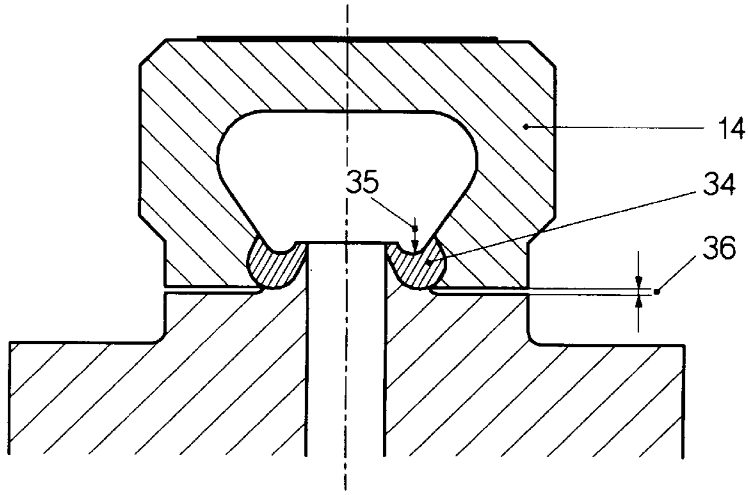
FIG. 6 shows the same measuring head after internal welding but before external welding.

FIG. 6 shows the state after the internal welding, with the welding gap S reduced to the external welding gap 36 by the pressure welding. The welding zone 34 has a transition radius 35 which is free of internal gaps. Consequently the pressure pulses from inside find no vulnerable surfaces, which owing to notch effect might lead to migratory cracks.

The remaining external welding gap 36 is closed in a further operation by laser, gas or electron beam welding.

Figure 7:
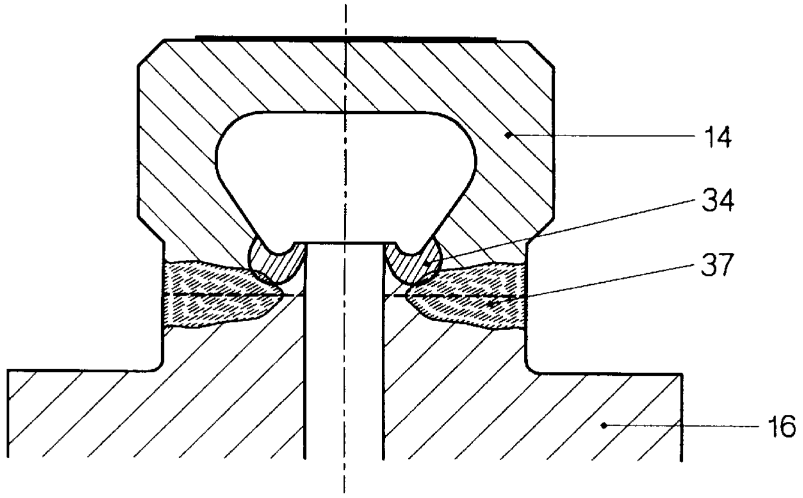
FIG. 7 shows the finished join between measuring head and threaded part.

FIG. 7 shows the final state after performing the external weld, which constitutes the external welding zone 37 that may merge into the internal welding zone 34.

With the internal and external weldings according to the invention, the risk of migratory cracks from inside is banished and the mechanical strength of the highly stressed connection between the measuring head 14 and the threaded body 16 is assured from outside.

The geometry of the balloon-like pressure measuring space according to the invention, with pressure head portion 23 and pressure neck portion 24, combining internal welding to prevent migratory cracks from inside and external welding to assure the mechanical strength of the connection between measuring head 14 and threaded body 16, having also the smallest possible diameter d for the in-lead 19, provides the basis for a high-pressure sensor capable of continuous operation involving peak pressures up to 2500 bar. The design of the measuring bridge 22 placed on the diaphragm part 21 can be based on various known technologies.

What is claimed is:

1. A high-pressure sensor comprising a measuring head including a pressure measuring space having a constant balloon-shaped configuration in its pressurized and unpressurized condition and divided into a pressure head portion with a first diameter and having a deflection portion on which a pressure pick-up is mounted and a pressure neck portion with a second diameter smaller than the first diameter, and the measuring head being welded to a threaded body.

2. A high-pressure sensor according to claim 1, wherein the measuring head is welded to the threaded body so that the pressure measuring space is free of welding gaps, which lead to migratory cracks due to a notch effect.

3. A high-pressure sensor according to claim 1 wherein the welding of the measuring head to the threaded body includes an eternal weld.

4. A high-pressure sensor according to claim 1 wherein the weld between measuring head and threaded body includes an internal weld and an external weld.

5. A high-pressure sensor according to claim 4, wherein the internal weld is over a welding cone on the threaded body and extends over an edge of the neck portion, and the internal weld includes a gapless transition radius.

6. A high-pressure sensor according to claim 4 wherein the external weld and the internal weld partially overlap, so that there is a weld connection throughout the connection between the measuring head and the threaded body.

7. A high-pressure sensor according to claim 1, wherein the measuring head and threaded body are joined by a single weld.

8. A high-pressure sensor according to claim 1, wherein the threaded body has a through hole of a diameter smaller than second diameter of the pressure neck portion of the pressure measuring space.

9. A high-pressure sensor according to claim 1, including a sealing part on the threaded body distal from the measuring head.

10. A high-pressure sensor according to claim 1, wherein the pick-up is a measuring bridge.

11. A high-pressure sensor comprising:

a measuring head including a pressure measuring space having a substantial constant balloon-shaped configuration in a pressurized and unpressurized condition and with a deflection portion on which a pressure pick-up is mounted;

a threaded body including a through hole connected to the pressure measuring space;

a first internal weld connecting the measuring head to the threaded body; and a second external weld connecting the measuring head to the threaded body.

12. A high-pressure sensor according to claim 11 wherein the threaded body includes a cone portion extending from a top surface of the body; and the first internal weld joins the measuring head to the cone portion and the second external weld joins the measuring head to a top surface of the threaded body.

13. A high-pressure sensor according to claim 12 wherein the first and second welds overlap to form a continuous seal.

* * * * *